(12) United States Patent
Zawacki et al.

(10) Patent No.: US 9,094,532 B2
(45) Date of Patent: Jul. 28, 2015

(54) MANNERS REMINDER

(75) Inventors: Jennifer Greenwood Zawacki, Hillsborough, NC (US); Axel Ramirez Flores, Durham, NC (US); Bradley Park Strazisar, Cary, NC (US); Howard J. Locker, Cary, NC (US); James Stephen Rutledge, Durham, NC (US); Julie Anne Morris, Raleigh, NC (US); Matthew Price Roper, Cary, NC (US); Michael Thano Matthews, Cary, NC (US); Scott Edwards Kelso, Cary, NC (US); Steven Richard Perrin, Raleigh, NC (US); Yi Zhou, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 788 days.

(21) Appl. No.: 13/026,662

(22) Filed: Feb. 14, 2011

(65) Prior Publication Data

US 2012/0208507 A1 Aug. 16, 2012

(51) Int. Cl.
*H04L 29/08* (2006.01)
*H04M 1/725* (2006.01)
*H04W 4/04* (2009.01)
*H04W 88/02* (2009.01)

(52) U.S. Cl.
CPC .......... *H04M 1/72569* (2013.01); *H04W 4/043* (2013.01); *H04W 88/02* (2013.01)

(58) Field of Classification Search
CPC ......... H04W 68/00; H04W 4/12; H04W 4/02; H04W 8/18; H04W 4/18; H04W 4/00; H04W 68/10; H04M 19/044; H04M 2250/12; H04M 19/047; H04M 1/72563
USPC ............. 455/418, 435.1, 550.1, 556.1, 414.1, 455/566, 567, 412.1, 458, 63.1, 412.2; 370/501, 573.1, 311, 252; 340/539.13, 340/8.1; 379/201.1
See application file for complete search history.

(56) References Cited

U.S. PATENT DOCUMENTS

| | | | |
|---|---|---|---|
| 8,175,989 B1 * | 5/2012 | Gopinath et al. | 706/45 |
| 2004/0127197 A1 * | 7/2004 | Roskind | 455/412.2 |
| 2004/0242160 A1 * | 12/2004 | Ichikawa et al. | 455/67.13 |
| 2008/0009313 A1 * | 1/2008 | Ishii | 455/556.1 |
| 2008/0036591 A1 * | 2/2008 | Ray | 340/540 |
| 2011/0078179 A1 * | 3/2011 | Unno | 707/769 |

* cited by examiner

*Primary Examiner* — Fred Casca
(74) *Attorney, Agent, or Firm* — Brian J. Pangrle (57) ABSTRACT

A method includes sensing a local environmental condition, receiving an electronic communication message, sensing a local microphone signal level associated with the communication message, and issuing a notification if the local microphone signal level exceeds a threshold associated with the local environmental condition. In such a method, an electronic communication may be a telephone call, a video call, a text message, a message communicated via a short message service, a message communicated via a multimedia message service or other type of message. Various other apparatuses, systems, methods, etc., are also disclosed.

14 Claims, 8 Drawing Sheets

MANNERS REMINDER

TECHNICAL FIELD

Subject matter disclosed herein generally relates to technology for promoting good manners of users of cell phones or other devices.

BACKGROUND

As cell phones and other communication devices have reached high levels of saturation amongst the populace, instances of bad usage manners have increasingly annoyed others. Perhaps the most annoying etiquette violation is cell phone use in a movie theater where ringing, light from a display, user's voice and caller's voice can disturb others. As described herein, various technologies can provide for improved user manners.

SUMMARY

A method includes sensing a local environmental condition, receiving an electronic communication message, sensing a local microphone signal level associated with the communication message, and issuing a notification if the local microphone signal level exceeds a threshold associated with the local environmental condition. In such a method, an electronic communication may be a telephone call, a video call, a text message, a message communicated via a short message service, a message communicated via a multimedia message service or other type of message. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
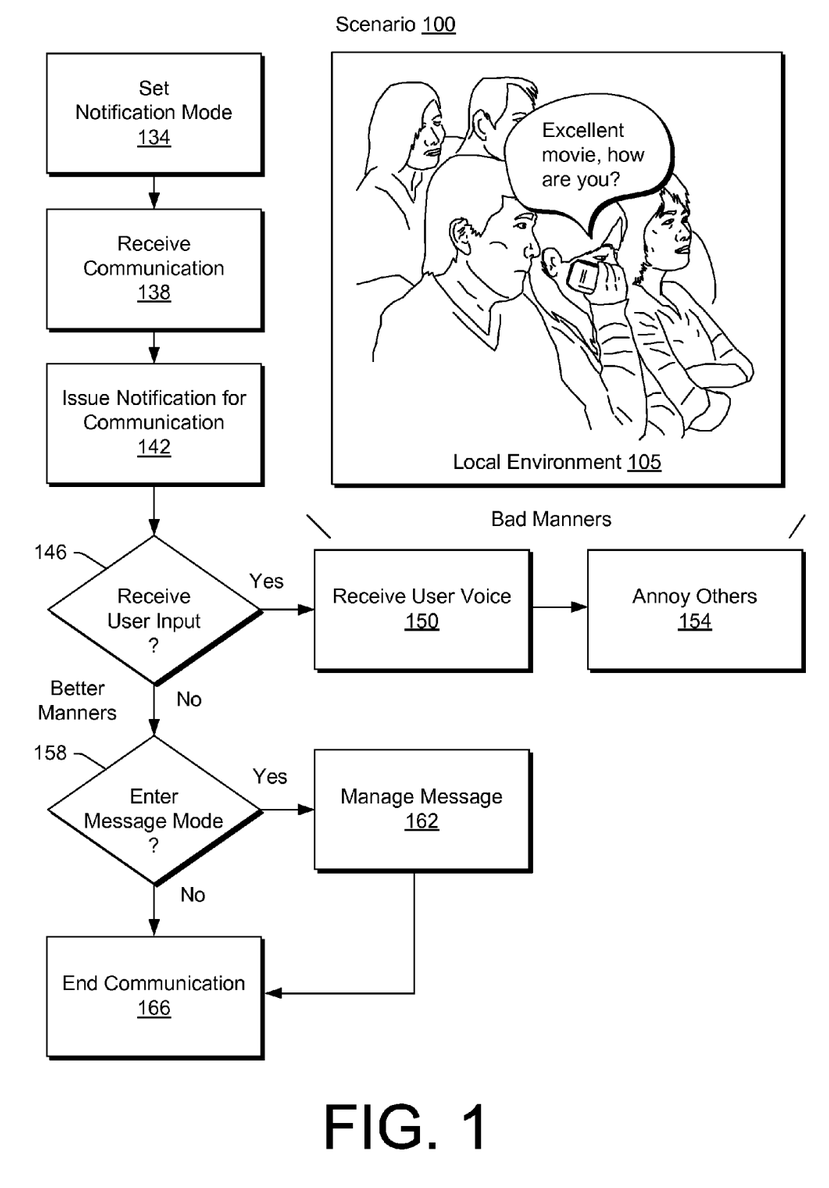
FIG. 1 is a diagram of a conventional scenario for usage of a communication device.

FIG. 1 shows a scenario 100 where, for example, a user in a local environment 105 such as a theater may receive a communication and communicate with another, presumably in a remote environment (e.g., outside the theater).

In the example of FIG. 1, a set block 134 provides for a user setting a notification mode of a communications device. For example, a user may set a device to a vibrate mode or an audible mode. In general, this selection is made by a user prior to entering the local environment, upon entry into the local environment or at some time after entry into the local environment. For example, a user may normally set a cell phone to vibrate mode or to audible mode without ever switching the setting. In another example, a user may see a reminder on a movie screen and then switch from an audible mode to a vibrate mode. In yet another example, a person with perhaps the best manners simply switches off the communications device or completely disables issuance of any notification that a communication has arrived.

In a reception block 138, a communication device receives a communication. For example, where the device is a cell phone, it may receive a telephone call as a coded digital message from a transmission tower, satellite, etc. Other examples of electronic communication messages include video calls, text messages, messages via a short message service, messages via a multimedia message service, etc. In general, a communication message is typically communicated using electro-magnetic waves via a line, a fiber, airspace, outer space, etc. A communication message typically includes destination information, for example, to allow a message to be properly communicated to a device (or other destination) associated with a user (e.g., a telephone number, an email address, etc.). Referring again to the method, responsive to receipt of a communication, an issuance block 142 causes the communications device to issue a notification, for example, according to the set notification mode per the set block 134.

In the example of FIG. 1, a decision block 146 follows that decides whether user input has been received. For example, a user may push a hardware button, a control graphic on a touch screen or utter a verbal command, as input, that causes the device to allow for two way communication between the user and another. Where the decision block 146 decides that user input has been received to communicate with another, the scenario 100 continues at a reception block 150 where the device receives the user's voice, which is then transmitted to the other.

For the example of FIG. 1, in the local environment 105, the user's voice communicates the message: "Excellent movie, how are you?". In such an example, the person (or persons) being communicated to may also be implicated to demonstrate good manners. In such an example, another may realize "she's in a movie theater, I should end this call". In the absence of good manners on one end or another, as occurs too often, the communication proceeds as if it was completely acceptable to annoy others, as indicated by the annoyance block 154 (see, e.g., a person with crossed arms and another glaring in dismay at the person with a cell phone).

In practice, another conventional option exists, referred to as "better manners". For example, where the decision block 146 does not receive user input, the communications device may enter another decision block 158 that decides whether a message mode is available. Where the decision block 158 decides that such a mode is available, a management block 162 follows, which may cause local or remote management of a message (e.g., a voice message system, a text message system, etc.). After management of the message, the communication may be ended per an end block 166, which may act to terminate the communication. Where the decision block 158 decides that a message mode is unavailable or otherwise not indicated, the end block 166 may terminate the communication.

Figure 2:
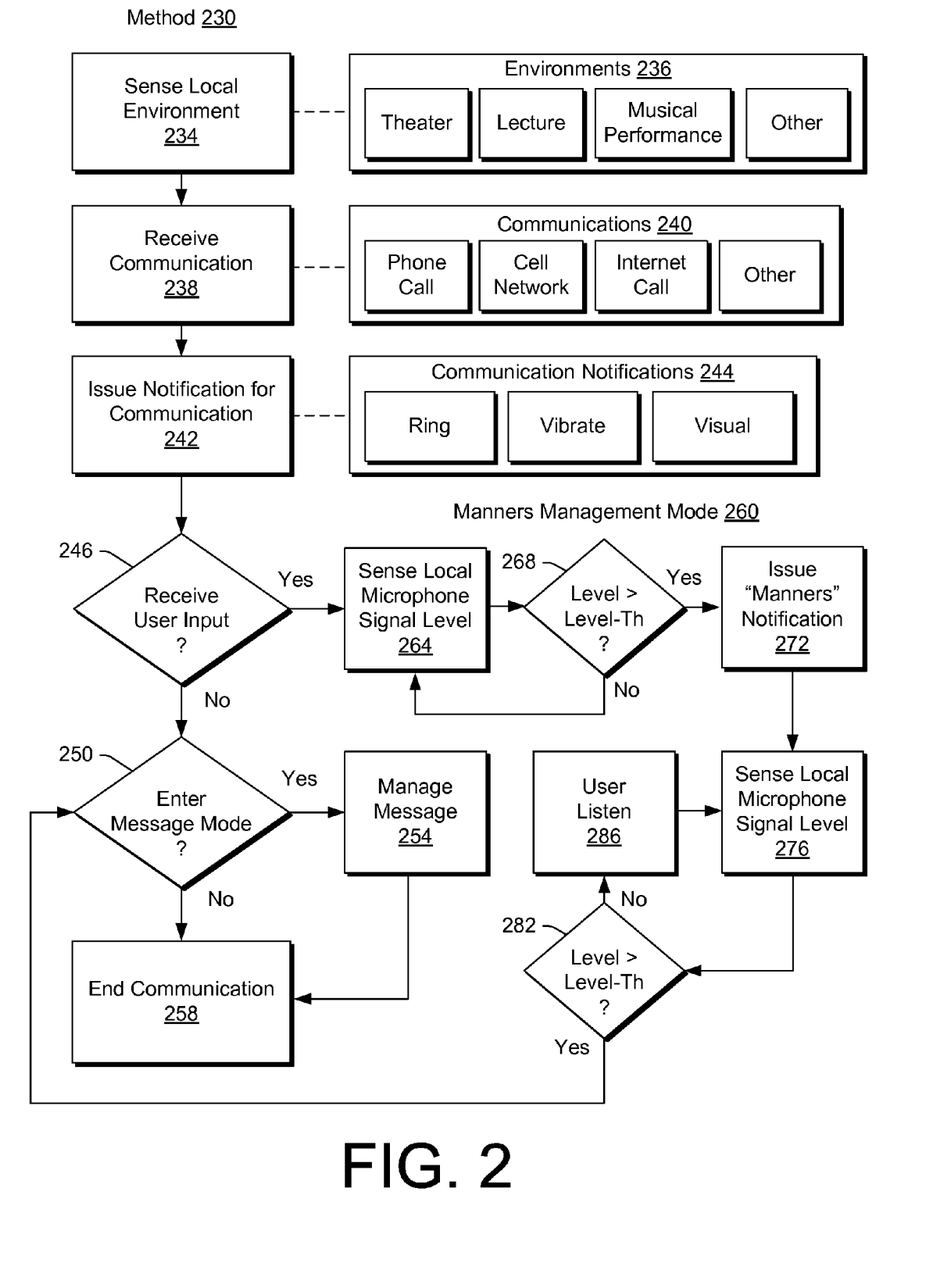
FIG. 2 is a diagram of an example of a method that can implement manners management features.

As described herein, various techniques can help enforce good manners, prompt a user to implement good manners, etc. FIG. 2 shows an example of a method 230. In a sense block 234, sensing occurs to sense information about a local environment. A local environment 236 may be characterized or classified as a theater, lecture, musical performance, or other environment that calls for appropriate manners. In a reception block 238, receiving occurs to receive a communication, which may be a request sent by a network in response to a remote event (e.g., someone placing a telephone call, sending a text message, etc.). A communication 240 may be a telephone call, a cell network, an internet call, or other type of communication.

In the example of FIG. 2, in an issuance block 242, issuing occurs for a notification associated with a received communication (e.g., a request to establish two-way communication). A communication notification 244 may be an audible notice, a mechanical notice, a visual notice or other type of notice.

In the example of FIG. 2, a decision block 246 follows that decides whether user input has been received. For example, a user may push a hardware button, a control graphic on a touch screen or utter a verbal command, as input, that causes the device to allow for two way communication between the user and another. Where the decision block 246 decides that user input has been received, the method 230 may enter into a manners management mode 260; otherwise, where the decision block decides that user input has not been received to communicate with another, the method 230 may continue at another decision block 250. The branch for the decision block 250 is described below followed by the branch for the manners management mode 260.

As explained with respect to the scenario 100 of FIG. 1, in practice, a conventional option may exist, for example, where the decision block 246 decides that it did not receive user input and where, in response, the method 230 continues at the decision block 250 for deciding whether a message mode is available. Where the decision block 250 decides that such a mode is available, a management block 254 follows, which may cause local or remote management of a message (e.g., a voice message system, a text message system, etc.). After management of the message, the communication may be ended per an end block 258, which may act to terminate the communication. Where the decision block 250 decides that a message mode is unavailable or otherwise not indicated, the end block 258 may terminate the communication.

As to the manners management mode 260, in a sense block 264 sensing occurs for a local microphone signal level (e.g., level of input received via a microphone of a device). A decision block 268 follows that decides whether the local microphone signal level exceeds a level threshold. If the decision block 268 decides that the level does not exceed the level threshold, the method 230 continues at the sense block 264. However, where the decision block 268 decides that the level exceeds the level threshold, the method 230 continues in an issuance block 272 for issuing a manner notification. Such a manners notification may be to one or more users, whether local or remote. Such a manners notification may be an audible notification, a mechanical notification, a visual notification or other type of notification. A manners notification may be of multiple forms (e.g., mechanical and visual) and may be in a form or forms depending on the nature of a sensed environment. One or more manners notifications may be transmitted to one or more remote users, where the actual form of issuance at a remote location may depend on the remote location environment.

Referring again to the issuance block 272, the method 230 continues at a sense block 276 to sense a local microphone signal level. Another decision block 282 follows for deciding whether the level exceeds a level threshold. If the decision block 282 decides that the level does not exceed the level threshold (which may be the same or different than the level threshold of the decision block 268), the method 230 may continue in a "listen" block 286 that allows for listening by a user. Such a block may cause a graphic user interface to be rendered to a display of a device that states "listen only" and an option may exist to disable or override the "listen only" state. In the example of FIG. 2, after the listen block 286, the method 230 continues at the sense block 276, where a loop is repeated to ensure that the local microphone signal level does not exceed the level threshold of the decision block 282.

In instances where the decision block 282 decides that the level exceeds the level threshold, the method 230, as in the manners management mode 260, may continue at the decision block 250, which acts to manage a message per the block 254, if a message mode is available, or to terminate a communication per the end block 258.

Figure 3:
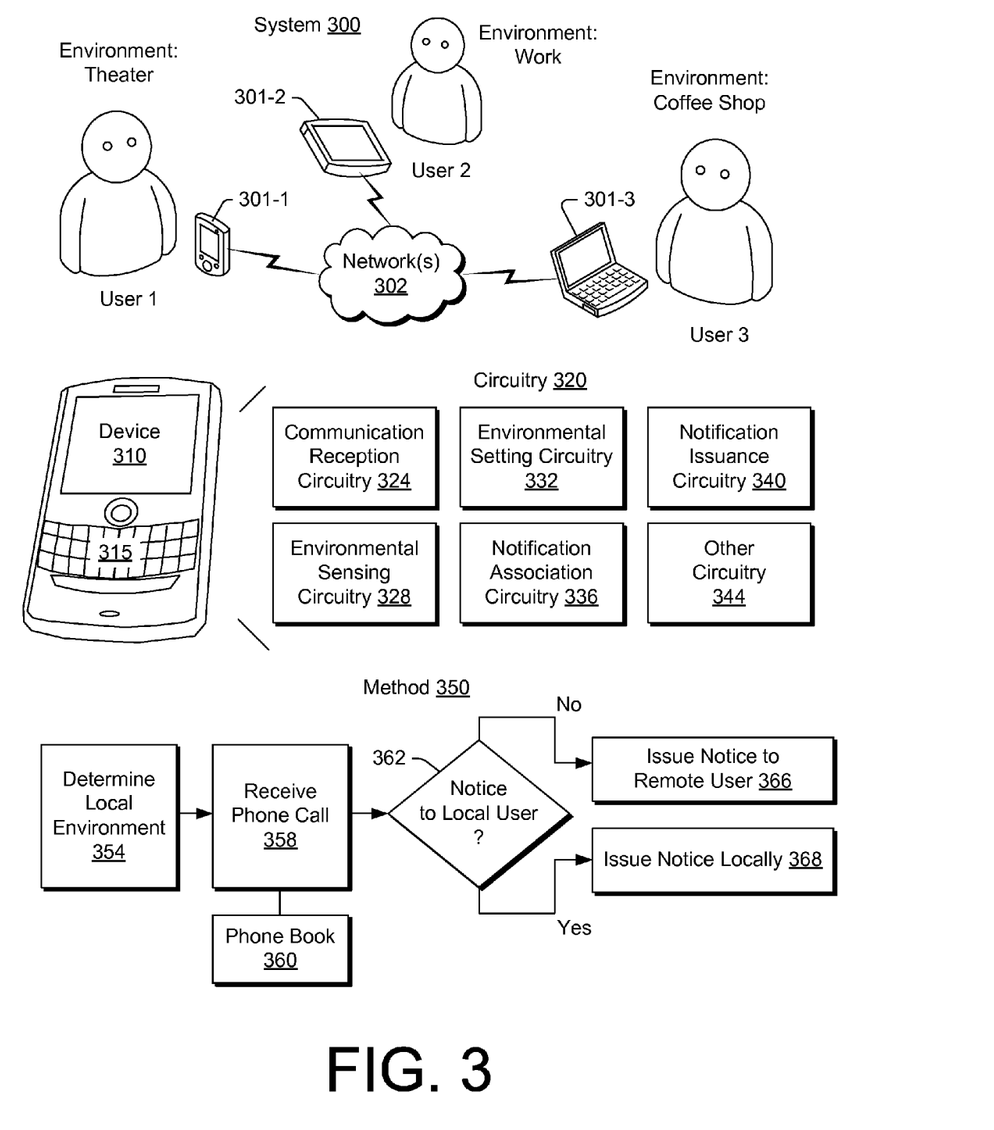
FIG. 3 is a series of diagrams of examples of a system, a device and a method.

FIG. 3 shows examples of a system 300, a device 310, circuitry 320 and a method 350. The system 300 includes various users in different local environments such as a theater (User 1), work (User 2) and a coffee shop (User 3). Each of the users has an associated device 301-1, 301-2 and 301-3 configured for communication via a network 302, which may be a multimodal network (e.g., WiFi, satellite, cell, etc.).

While the device 310 is shown with a smart phone format that includes physical keys 315, a device may have a different format (e.g., tablet, notebook computer, watch, etc.). In the example of FIG. 3, the circuitry 320 includes communication reception circuitry 324, environmental sensing circuitry 328, environmental setting circuitry 332, notification association circuitry 336, notification issuance circuitry and other circuitry 344.

In the context of an example where a telephone call is a communication, as described herein, a device may include circuitry configured to receive a telephone call (e.g., the circuitry 324), circuitry configured to sense information for at least one local environmental condition (e.g., the circuitry 328), circuitry configured to determine an environmental setting based on sensed information for at least one local environmental condition (e.g., the circuitry 332), circuitry configured to associate a notification with an environmental setting (e.g., the circuitry 336), and circuitry configured to issue a notification associated with an environmental setting responsive to receipt of a telephone call (e.g., the circuitry 340). While a telephone call is mentioned in the foregoing example, circuitry may be configured for receipt of one or more other types of communication, additionally or alternatively. For example, a communication may be an electronic communication message such as a video call, a text message, a message via a short message service (SMS), a message via a multimedia message service (MMS), etc.

As described herein, a device may include circuitry configured to issue a notification in response to receipt of a communication message (e.g., a telephone call or other communication message) and a sensed level (e.g., audio, light, etc.) associated with the communication message that exceeds a threshold where such a notification may be an audio notification, a visual notification, a mechanical notification or other type of notification (e.g., including multimodal types of notifications). For an example that includes text messaging, a microphone may optionally sense sounds generated by selecting keys of a keyboard (e.g., whether physical keys or keys rendered to a display). In such an example, a notification may indicate that key noise (physical or artificial click) is, manners-wise, too loud for a given environment (e.g., compared to ambient). Other examples of sensed levels include voice level of a user of the device, light level as emitted by a display of the device, etc. As described herein, circuitry configured to issue a notification can include circuitry to issue multiple notifications responsive to a sensed level or levels that exceed a threshold or thresholds. Multiple notifications may intensify and optionally, ultimately, act to terminate a communication.

In various examples, the type of notification may be selected based on the type of communication. For example, for a text message, a notification may be a visual message rendered to a display to instruct a user to disable "key click" sounds (e.g., which may annoy others in a given environmental setting). As another example, where the ambient light level is low, a notification may instruct a user to decrease an intensity level of a display. As described herein, such notifications may optionally cause a device to automatically disable a feature, alter a display intensity, etc., as appropriate to promote good manners (e.g., to avoid annoyance to others in an environmental setting). A notification may optionally be a result of an action, for example, no audible key clicks, a dim display, etc. For example, when a user realizes that key clicks are off, he may consider that the lack of key clicks serves as a warning to mind his manners. A dim display (e.g., low intensity, no backlighting, etc.) may operate as such a warning.

In the example of FIG. 3, the method 350 commences in a determination block 354 that determines a local environment (e.g., based on sensed or other input). In a reception block 358, a telephone call is received, which may be associated with information per a phone book 360 (e.g., contacts database, etc.). A decision block 362 follows that decides whether a manners mode calls for issuance of a notice to a remote user per the issuance block 366 or to a local user per the issuance block 368. While not shown in the example method 350 of FIG. 3, a method may issue notices to a local user and one or more remote users. For example, where User 1 is in a theater and receives a joint telephone call (e.g., conference call) from User 2 and User 3, a method may determine that, to encourage good manners, it would be appropriate to issue notices to the device 301-2 of User 2 and to the device 301-3 of User 3 in addition to issuing a notice to or at the device 301-1 of User 1.

As described herein, circuitry may optionally be located remote from a "local" user. For example, a server may monitor a voice level and, in response to a manners violation, cause one or more notices to be issued to promote good manners (e.g., appropriate etiquette). In such an example, the remote machine may have knowledge as to locations of the devices associated with each person communicating. For example, network identifying information (e.g., cell tower, WiFi "hot spot", etc.) may indicate that User 1 is in a theater, User 2 is at work and that User 3 is in a coffee shop. Given such information, control logic of a networked machine may cause issuance of notices to one or more of the users.

Figure 4:
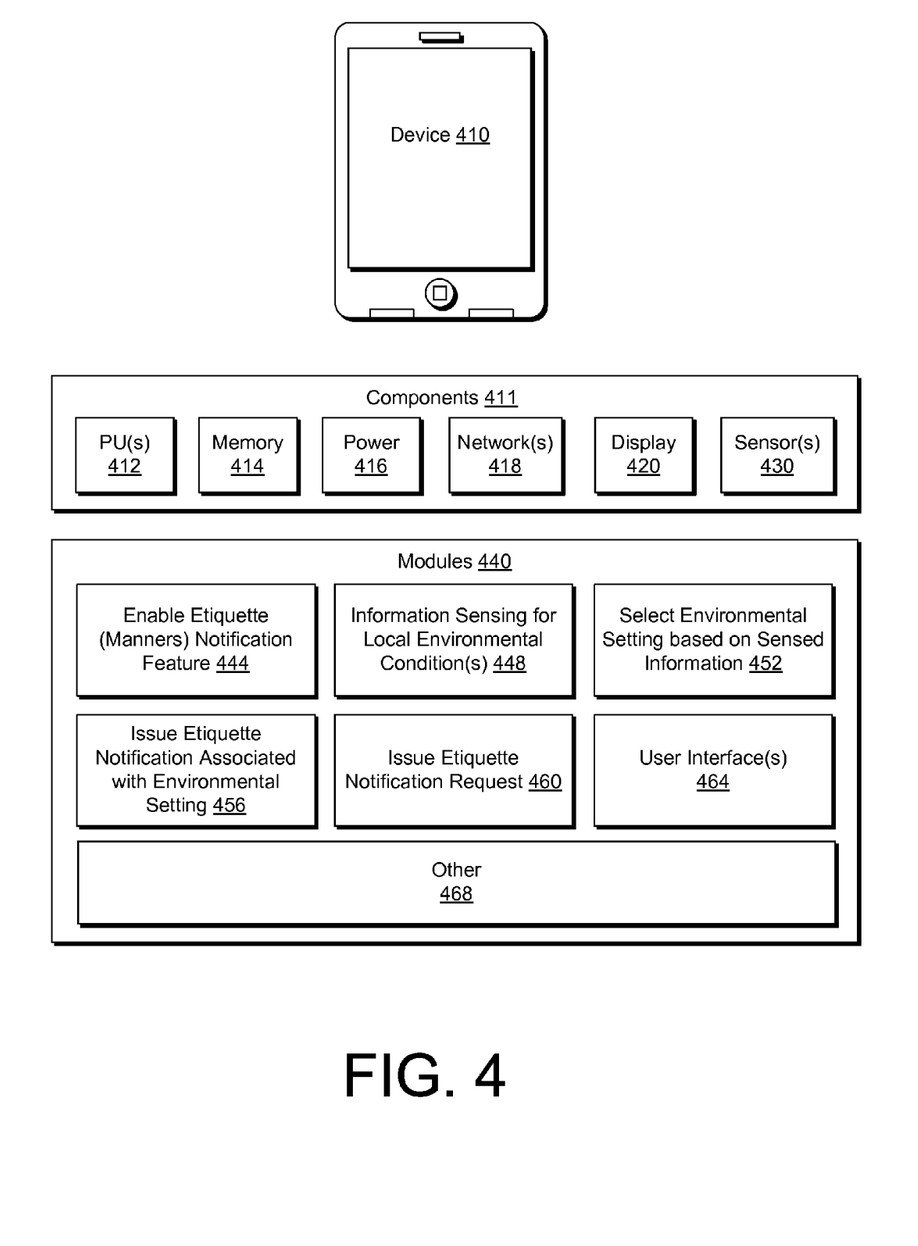
FIG. 4 is a series of diagrams of examples of components and modules.

FIG. 4 shows examples of a device 410, components 411 and modules 440, which may be machine-readable storage media that include processor-executable instructions to instruct a machine (e.g., a device or devices) to perform one or more acts. The components 411 include one or more processing units (PU) or cores 412, memory 414, power 416 (e.g., battery, solar, fuel cell, electromagnetic receptor, etc.), one or more network interfaces 418, a display 420 (or displays) and one or more sensors 430.

As mentioned, the modules 440 may be in the form of one or more machine-readable storage media that include processor-executable instructions to instruct a machine. The modules 440 may include a module 444 with instructions to enable an etiquette notification feature, a module 448 with instructions to sense information associated with at least one local environmental condition, a module 452 with instructions to select an environmental setting based at least in part on sensed information, a module 456 with instructions to issue an etiquette notification associated with an environmental setting responsive to receipt of a telephone call, a module 460 with instructions to issue an etiquette notification responsive to a local microphone signal level that exceeds a threshold for an environmental setting, a module 464 to implement one or more user interfaces (e.g., graphical or other), a module 468 to implement one or more other features (e.g., to issue an etiquette notification and to redirect a telephone call, etc.).

Figure 5:
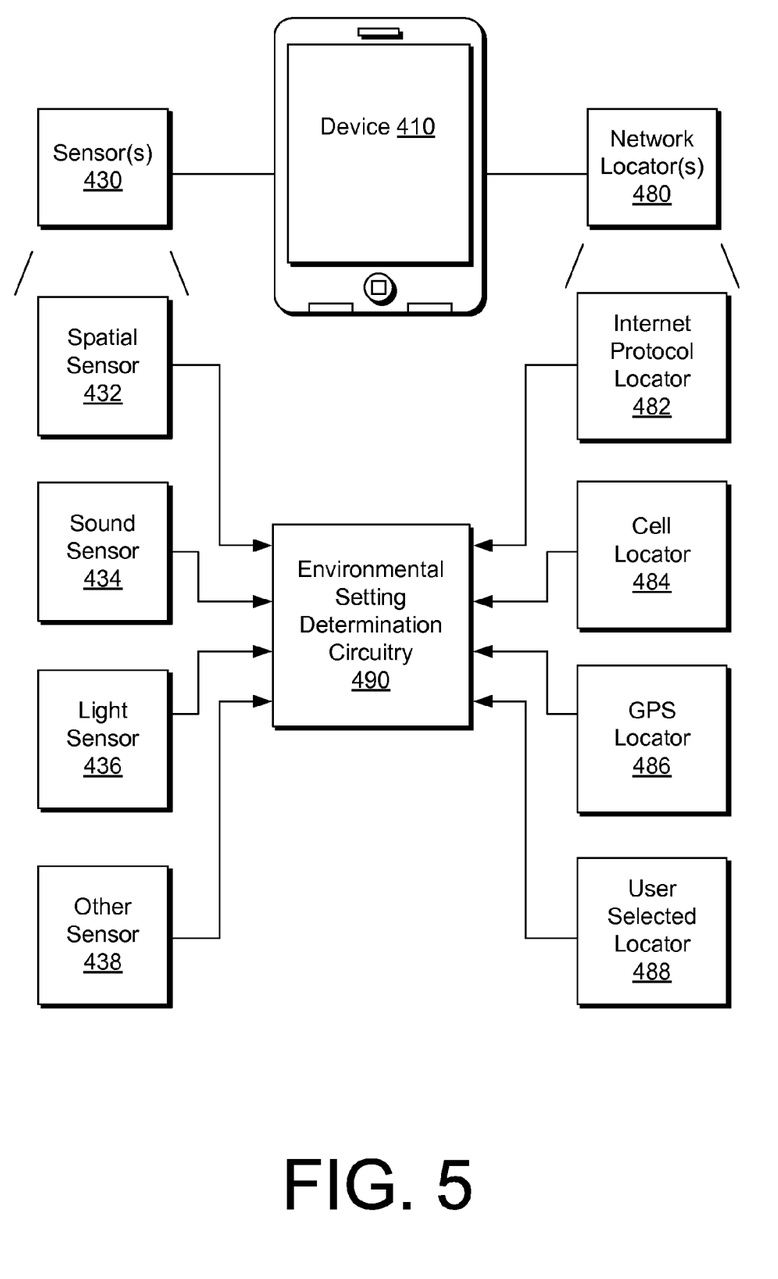
FIG. 5 is a diagram of an example of a communication device that includes one or more sensors, one or more network locators or a combination of one or more sensors and one or more network locators for determining an environmental setting.

FIG. 5 shows an example of the device 410 with one or more sensors 430, with one or more network locators 480 or with one or more sensors 430 and one or more network locators 480. As shown, the one or more sensors 430 may include a spatial sensor 432 (e.g., accelerometer, etc.), a sound sensor 434 (e.g., microphone, etc.), a light sensor 436 (photo-detector, camera, etc.), or other type of sensor 438. As shown, the one or more network locators 480 may include an Internet protocol locator 482, a cell locator 484, a global positioning system (GPS) locator 486, or a user selected locator 488 (e.g., an interface that allows a user to select a location or environmental setting).

In the example of FIG. 5, environmental setting determination circuitry 490 may be configured to receive one or more types of information such as sensed information and locator information to determine a local environmental setting of the device 410. The circuitry 490 may include features of the circuitry 452 of FIG. 4 and vice versa.

Figure 6:
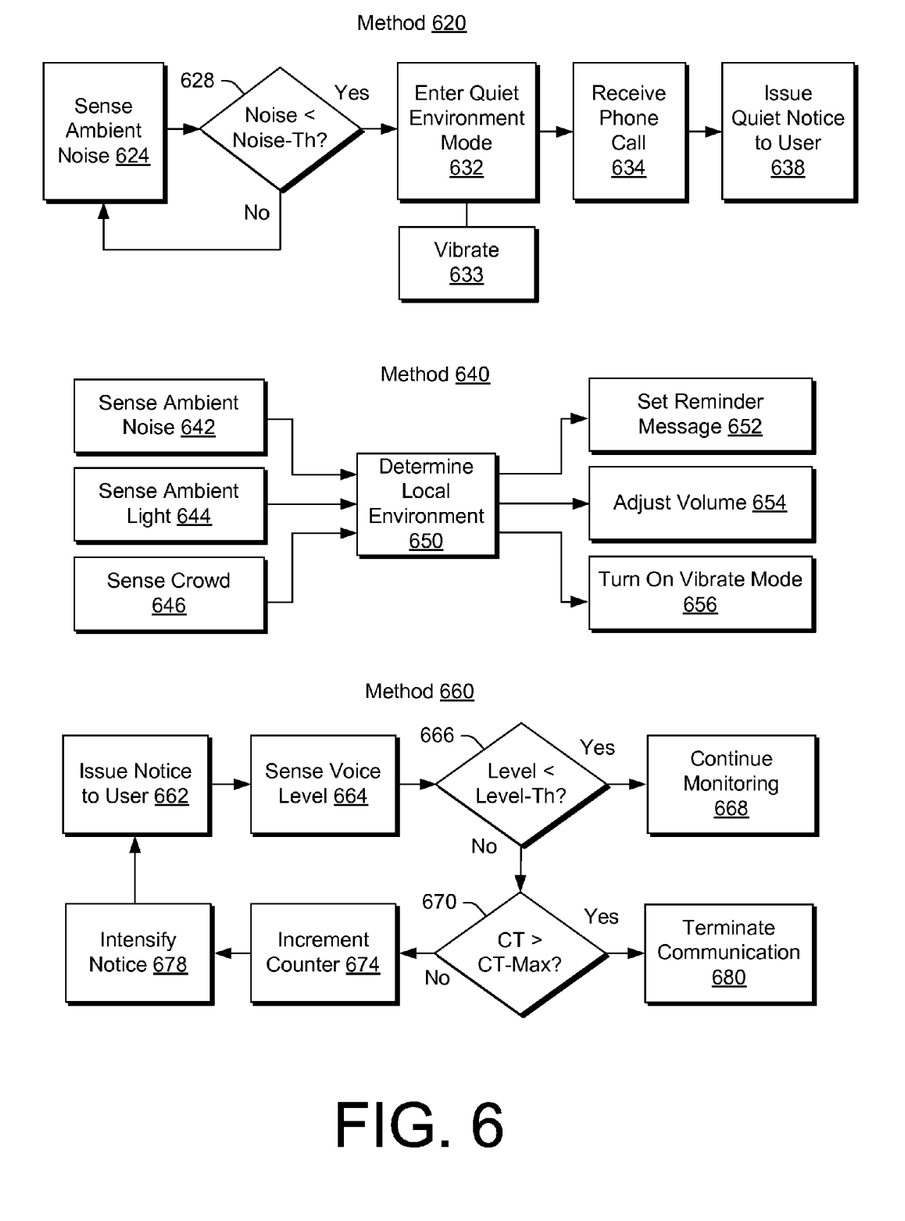
FIG. 6 is a series of diagrams of examples methods.

FIG. 6 shows example method 620, 640 and 660. The method 620 includes a sense block 624 for sensing ambient noise. A decision block 628 follows for deciding whether the sensed ambient noise is below an ambient noise threshold. If the decision block 628 decides that the noise is above the ambient noise threshold, the method 620 continues at the sense block 624. However, if the noise exceeds the threshold, the method 620 continues in a quiet mode block 632, which may optionally set a device to a particular notice mode, as indicated by the vibrate block 633. In a reception block 634, receiving of a telephone call occurs and, in response, an issuance block 638 provides for issuing a quiet notice to a user via a user device.

The method 640 includes one or more sense blocks for sensing ambient noise 642, sensing ambient light 644 and sensing presence of a crowd 646. Regarding sensing of a crowd, a device configured to access a network may be capable of detecting other devices in its presence (e.g., network traffic, congestion, etc.), alternatively, a device may be configured to assess noise or other sensed information to determine that a user of the device is in the presence of a crowd. According to the method 640, a determination block 650 provides for determining a local environment based on sensed input. In turn, the method 640 may set a reminder message per a block 652, adjust a volume per a block 654 or turn on a vibrate mode per a block 656. The aforementioned actions may promote better manners for a user of a communications device.

The method 660 commences in an issuance block 662 for issuing a notice to a user. A sense block 664 follows that senses a voice level. A decision block 666 decides whether the voice level is below a level threshold. If the level is below the level threshold, then the method 660 continues in a monitoring block 668, for example, to continue monitoring voice level.

In the example of FIG. 6, where the decision block 666 decides that the voice level exceeds the level threshold, the method 660 continues in another decision block 670 that decides if a count exceeds a maximum count (CT). If the maximum count is not exceeded, the method 660 continues at an increment block 674 to increment the count (CT) and an intensification block 678 to intensify the notice to be issued by the issuance block 662. If the decision block 670 decides that the maximum count is exceeded, the method 660 may continue at a termination block 680 to terminate a communication (e.g., a telephone call or other communication that involves voice input or output or both voice input and output). While the example of FIG. 6 mentions voice level, as described herein, other levels may be sensed. For example, a microphone may sense audible clicking, a photodetector may sense light intensity, and an accelerometer may sense movement. Such sensed information may be compared to one or more thresholds for purposes of making decisions.

Figure 7:
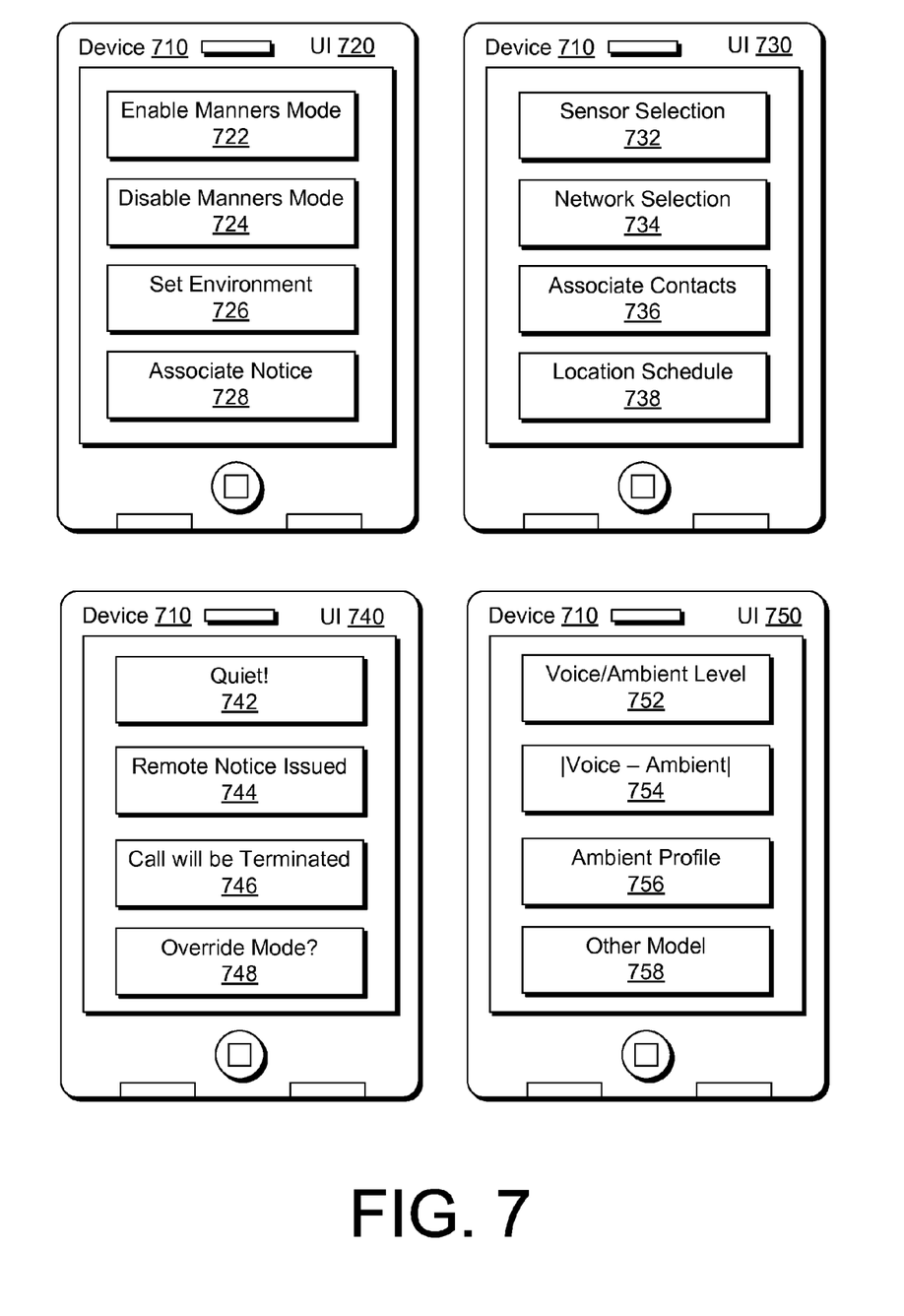
FIG. 7 is a series of diagrams of examples of graphical user interfaces.

FIG. 7 shows examples of user interfaces 720, 730, 740 and 750, which may be graphical user interfaces. The UI 720 may include an enable manners mode UI 722, a disable manners mode UI 724, a set environment UI 726 and an associate notice UI 728. The UI 730 may include a sensor selection UI 732, a network selection UI 734 (optionally to select one or more network locators), an associate contacts UI 736, and a location schedule UI 738 (e.g., to input a diary or calendar that provides a location such that a device can automatically enter a mode such as a manners mode according to the diary or calendar). The UI 740 may include a "Quiet!" notification graphic 742, a remote notice issued graphic 744, a call will be terminated graphic 746 (e.g., optionally with a countdown timer), and an override mode UI 748. The UI 750 may include a voice level to ambient noise level UI 752, a differential voice level to ambient noise level UI 754, an ambient profile UI 756 (e.g., with known ambient noise, light, etc., profiles to more readily identify an environmental setting), and an "other model" UI 758 that may allow a user to provide a customized or otherwise available model (e.g., downloadable via a network, etc.). While the UI 750 refers to a sensed voice level, a UI may provide for other sensed information to be handled in a similar manner (e.g., via a ratio, a differential, a profile, etc.).

As described herein, a method can include sensing a local environmental condition, receiving an electronic communication message, sensing a local microphone signal level associated with the communication message, and issuing a notification if the local microphone signal level exceeds a threshold associated with the local environmental condition. As described herein, an electronic communication message may be a telephone call, a video call, a text message, a message communicated via a short message service, a message communicated via a multimedia message service or other type of message communicated electronically (e.g., via a electro-magnetic waves over a line, a fiber, through space, etc.). As described herein, a threshold may be a voice level threshold (e.g., where sensing senses a local microphone signal level).

As described herein, a local environmental condition may be ambient sound. As described herein, a method may include associating a local environmental condition with an environmental setting, for example, where the environmental setting includes a setting selected a movie theater setting, a lecture setting, a musical performance setting or optionally another type of setting. As described herein, a method can include sensing a local environmental condition such as at least one of ambient sound, ambient light, orientation and movement.

As described herein, a method can include issuing a notification (e.g., a manners or "etiquette" notification) where the notification depends at least in part on an identifier that identifies a sender of the electronic communications message where the identifier is associated with a manners rating (e.g., an identifier associated with a person that may be a repeated violator of good manners). A device may include circuitry that allows a user to input or select a list of identifiers (e.g., numbers, etc.) and associate one or more of the identifiers with a manner rating (e.g., scale of 1 to 5, good to bad). As described herein, a method can optionally include use of a manners rating (e.g., a scale of good to bad manners) where issuing issues a more intense notification (e.g., whether audio, visual, mechanical, message, combination of notifications, etc.) based at least in part on the manners rating (e.g., "Please mind your manners" text or audio or audio and text, "Mind your manners" with vibrate, "Your manners!" with vibrate and visual, etc.). As described herein, a device may include features for enabling or disabling an etiquette feature where the etiquette feature provides for associating a notification with an environmental setting.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 8:
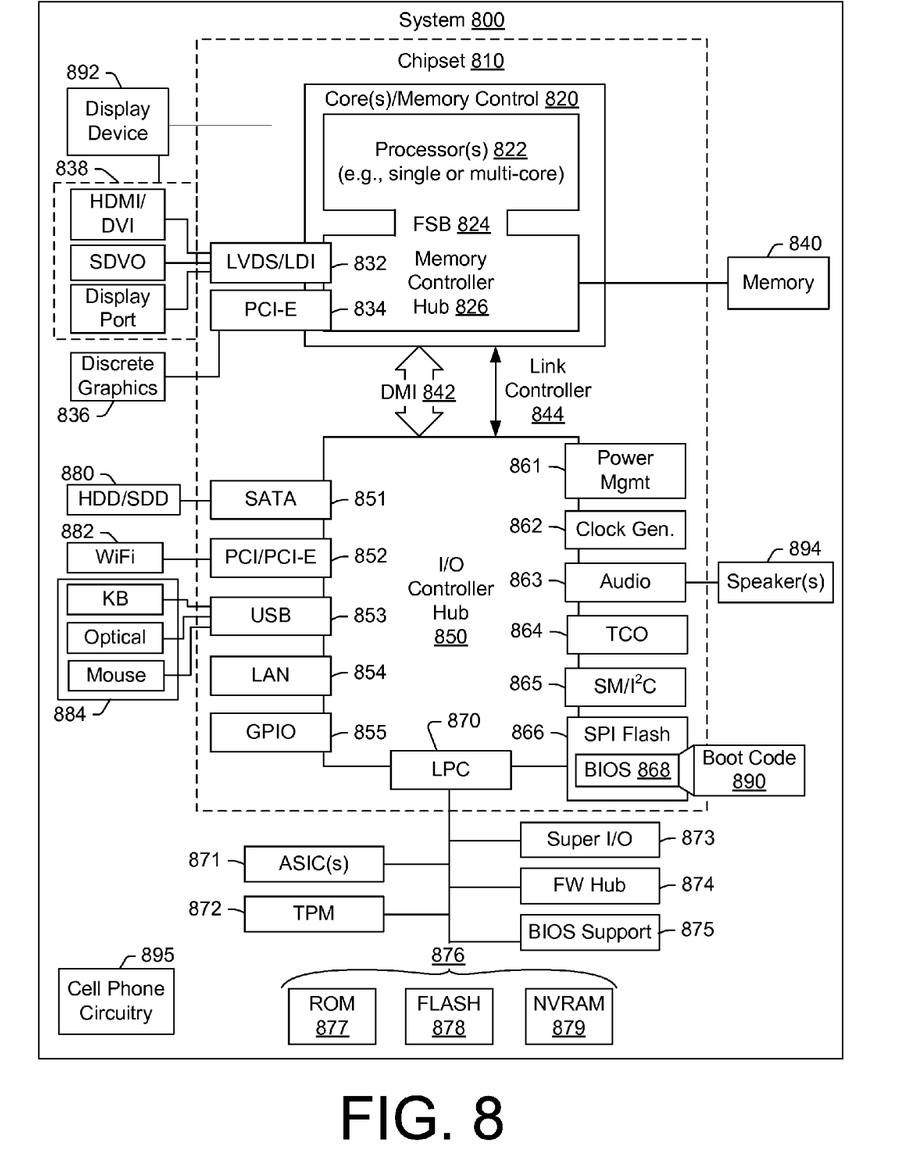
FIG. 8 is a diagram of an example of a machine.

While various examples of circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As described herein, a device such as one of the devices 301-1, 301-2, 301-3, 310, 410 and 710 may include at least some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors (see, e.g., the sensors 430 of FIG. 4), mice and various other devices (e.g., microphones, cameras, phones, storage, media players, etc.). On or more other types of sensors may optionally rely on the USB interface 853 or another interface (e.g., I$^2$C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800.

Conclusion

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method implemented by a mobile communication device, the method comprising:
   sensing ambient noise associated with a local environment;
   receiving via a network interface an electronic communication voice call associated with a sender;
   sensing a local microphone signal level associated with the electronic communication voice call;
   issuing a quiet notification via the network interface responsive to the local microphone signal level exceeding a threshold associated with the sensed ambient noise as associated with the local environment;
   after issuing the quiet notification, sensing a post-quiet notification local microphone signal level associated with the electronic communication voice call;
   issuing a message mode notification responsive to the post-quiet notification local microphone signal level exceeding the threshold; and
   entering a message mode for management of a message of the sender via a voice or text message system.

2. The method of claim 1 wherein the threshold comprises a voice level.

3. The method of claim 1 further comprising associating the sensed ambient noise with an environmental setting.

4. The method of claim 2 wherein the environmental setting comprises a setting selected from a group consisting of a movie theater setting, a lecture setting, and a musical performance setting.

5. The method of claim 1 further comprising sensing at least one environmental condition selected from a group consisting of ambient light, orientation and movement.

6. The method of claim 1 wherein the notifications comprise at least one member selected from a group consisting of an audio notification, a mechanical notification and a visual notification.

7. The method of claim 1 wherein at least one of the issuings depends at least in part on an identifier that identifies the sender of the electronic communication voice call wherein the identifier is associated with a manners rating.

8. The method of claim 7 wherein the manners rating comprises a scale of good to bad manners and wherein the issuing of the quiet notification issues a more intense quiet notification based at least in part on the manners rating.

9. The method of claim 1 further comprising enabling an etiquette feature wherein the etiquette feature provides for associating a notification with an environmental setting.

10. The method of claim 1 wherein issuing a message mode notification comprises issuing the message mode notification to a remote location.

11. The method of claim 1 wherein issuing a message mode notification comprises issuing message mode notifications locally and to a remote location.

12. A mobile communication device comprising:
network circuitry;
circuitry that senses ambient noise associated with a local environment;
circuitry that receives via the network circuitry an electronic communication voice call associated with a sender;
circuitry that senses a local microphone signal level associated with the electronic communication voice call;
circuitry that issues a quiet notification via the network circuitry responsive to the sensed local microphone signal level exceeding a threshold associated with the sensed ambient noise as associated with the local environment;
circuitry that senses a post-quiet notification local microphone signal level associated with the electronic communication voice call;
circuitry that issues a message mode notification responsive to the post-quiet notification local microphone signal level exceeding the threshold; and
circuitry that enters a message mode for management of a message of a sender via a voice or text message system.

13. The mobile communication device of claim 9 wherein the circuitry that issues a message mode notification comprises circuitry that issues message mode notifications locally and to a remote location.

14. One or more machine-readable non-transitory storage media comprising processor-executable instructions wherein the instructions comprise instructions to instruct a machine to:
sense ambient noise associated with a local environment;
receive via a network interface an electronic communication voice call associated with a sender;
sense a local microphone signal level associated with the electronic communication voice call;
issue a quiet notification via the network interface responsive to the sensed local microphone signal level exceeding a threshold associated with the sensed ambient noise as associated with the local environment;
sense a post-quiet notification local microphone signal level associated with the electronic communication voice call;
issue a message mode notification responsive to the post-quiet notification local microphone signal level exceeding the threshold; and
enter a message mode for management of a message of a sender via a voice or text message system.

* * * * *